(12) United States Patent
Zhou

(10) Patent No.: US 12,177,276 B2
(45) Date of Patent: Dec. 24, 2024

(54) AUDIO SYSTEM DATA SYNCHRONIZATION METHOD AND AUDIO COMPONENT

(71) Applicant: CHENGDU AMBIT TECHNOLOGY CO., LTD., Sichuan (CN)

(72) Inventor: Bin Zhou, Chengdu (CN)

(73) Assignee: CHENGDU AMBIT TECHNOLOGY CO., LTD., Chengdu (CN)

( * ) Notice: Subject to any disclaimer, the term of this patent is extended or adjusted under 35 U.S.C. 154(b) by 637 days.

(21) Appl. No.: 17/425,965

(22) PCT Filed: Apr. 20, 2021

(86) PCT No.: PCT/CN2021/088492
§ 371 (c)(1),
(2) Date: Jul. 27, 2021

(87) PCT Pub. No.: WO2022/156081
PCT Pub. Date: Jul. 28, 2022

(65) Prior Publication Data
US 2023/0283650 A1     Sep. 7, 2023

(30) Foreign Application Priority Data

Jan. 22, 2021   (CN) .......................... 202110085454.3

(51) Int. Cl.
*H04L 65/60* (2022.01)
*H04L 1/1607* (2023.01)
*H04W 56/00* (2009.01)

(52) U.S. Cl.
CPC ............ *H04L 65/60* (2013.01); *H04L 1/1607* (2013.01); *H04W 56/00* (2013.01)

(58) Field of Classification Search
CPC ..... H04L 65/60; H04L 1/1607; H04L 1/1887; H04L 5/0055; H04L 65/1069;
(Continued)

(56) References Cited

U.S. PATENT DOCUMENTS 10,244,307 B1    3/2019  Tong
10,880,045 B2 *  12/2020 Goyal .................. H04L 5/0055
(Continued)

FOREIGN PATENT DOCUMENTS

CN      105284134 A     1/2016
CN      108337074 A     7/2018
(Continued)

OTHER PUBLICATIONS

Communication pursuant to Article 94(3) EPC dated Aug. 19, 2022, for European application No. 21734752.5.
(Continued)

*Primary Examiner* — Chi H Pham
*Assistant Examiner* — Samuel Dilan Rutnam
(74) *Attorney, Agent, or Firm* — Joseph T. Leone; DeWitt LLP

(57) ABSTRACT

An audio system data synchronization method and an audio component are provided. The method includes: the first device receiving in an n-th cycle an audio data packet sent by the audio data source and judging whether receiving is successful; the second device receiving in the n-th cycle the audio data packet and judging whether receiving is successful; if the receiving of the first device and/or the second device is failed, one of the first and second devices whose receiving is failed sending a first special acknowledge packet in the n-th cycle; after receiving the NAK packet, making the audio data source re-send the audio data packet in an n+1-th cycle; and after receiving the first additional field, making the other device stop sending a signal in the n-th cycle, and receive, in synchronization with the device whose receiving is failed, in the n+1-th cycle the re-sent audio data packet.

18 Claims, 10 Drawing Sheets

(58) Field of Classification Search
CPC .... H04L 1/1829; H04L 1/1867; H04W 56/00; H04W 4/80; H04R 2430/01; H04R 3/12; H04B 5/00; H04B 5/72
See application file for complete search history.

(56) References Cited

U.S. PATENT DOCUMENTS

| | | | |
|---|---|---|---|
| 2008/0288845 | A1 | 11/2008 | Tsfati et al. |
| 2019/0104424 | A1* | 4/2019 | Hariharan ............. H04L 1/1621 |
| 2020/0322092 | A1 | 10/2020 | Goyal et al. |

FOREIGN PATENT DOCUMENTS

| | | | | |
|---|---|---|---|---|
| CN | 108419228 | A | | 8/2018 |
| CN | 109905925 | A | | 6/2019 |
| CN | 109995479 | A | | 7/2019 |
| CN | 110519742 | A | | 11/2019 |
| CN | 110753284 | A | | 2/2020 |
| CN | 110769347 | A | | 2/2020 |
| CN | 210075543 | U | * | 2/2020 |
| CN | 111031437 | A | * | 4/2020 ........... H04L 5/0055 |
| CN | 112423198 | A | | 2/2021 |
| WO | WO 2013032578 | A1 | | 3/2013 |
| WO | WO 2014036517 | A1 | | 3/2014 |

OTHER PUBLICATIONS

European Search Report dated Apr. 7, 2022, for European Application No. 21734752.5.
First Office Action for China application No. 202110085454.3.
International Search Report and Written Opinion dated Jul. 7, 2021, for PCT application No. PCT/CN2021/088492.
Notification of Grant Patent Right for Invention for China application No. 202110085454.3.
Research on Enhancing the Transmission Performance of Bluetooth and baseband IC design. China Academic Journal Electronic Publishing House. 2013.

* cited by examiner

AUDIO SYSTEM DATA SYNCHRONIZATION METHOD AND AUDIO COMPONENT

CROSS-REFERENCE TO RELATED APPLICATION

The present disclosure claims the priority to the Chinese patent application with the filing number 202110085454.3, filed on Jan. 22, 2021 with the Chinese Patent Office, and entitled "Audio System Data Synchronization Method and Audio Component", the contents of which are incorporated herein by reference in entirety.

TECHNICAL FIELD

The present disclosure relates to the technical field of audio data synchronization, in particular to an audio system data synchronization method (i.e. a data synchronization method for an audio system) and an audio component.

BACKGROUND ART

The conventional wireless Bluetooth audio system is generally provided with a wireless connection established by two audio players (for example, two earphones or two sounds, etc.) with an audio gateway (which may be a mobile phone or a tablet, etc.) through a Bluetooth protocol. One of the two audio players serves as a master device, and the other serves as a slave device. The master device acquires an audio data packet from the audio gateway, and then transmits the audio data packet to the slave device, so that the two audio players may play the audio data synchronously. However, the time when the master device and the slave device receive the same audio data packet using this method may be inconsistent, resulting in asynchronous playing that easily occurs, so that sound quality is relatively poor.

Therefore, in the prior art, there appears a player having two audio players being set in an equal status, where the two audio players acquire an audio data packet from the audio gateway respectively, the two earphones are divided in a master earphone and a slave earphone, the slave earphone sends an ACK (Acknowledge Character) to the master earphone, and the master earphone sends the same uniformly to a mobile phone end. This method has the master earphone and the slave earphone, and will result in inconsistent power consumption of the master and slave earphones.

With regard to the above problems, currently there is no effective technical solution yet.

SUMMARY

In order to solve the technical problem already existing in the art, an embodiment of the present disclosure provides an audio system data synchronization method and an audio component, for example, interference occurring between feedback packets sent by two devices may be avoided, and the power consumption of a first device and a second device may be coordinated and synchronism of the audio data may be improved.

An embodiment of the present disclosure provides an audio system data synchronization method, wherein the audio system includes an audio data source, a first device, and a second device; and the method includes:

the first device receiving an audio data packet sent by the audio data source in an n-th cycle, and judging whether the receiving is successful; and the second device receiving the audio data packet sent by the audio data source in the n-th cycle, and judging whether the receiving is successful, wherein if the receiving of the first device and/or the second device is failed, one device of the first device and the second device whose receiving is failed sends a first special acknowledge packet in the n-th cycle, wherein the first special acknowledge packet includes a first additional field and an NAK packet, the audio data source is made to re-send, after receiving the NAK (Negative Acknowledgement) packet, the audio data packet in an n+1-th cycle, and the other device is made to stop sending a signal in the n-th cycle after receiving the first additional field, and receive in the n+1-th cycle the audio data packet re-sent by the audio data source in synchronization with the device whose receiving is failed.

Optionally, in the audio system data synchronization method of an embodiment of the present disclosure, the method further includes:

if both the first device and the second device successfully receive, one device of the first device and the second device sending an ACK packet to the audio data source; and making the audio data source send a next audio data packet in the n+1-th cycle according to the ACK packet.

Optionally, in the audio system data synchronization method of an embodiment of the present disclosure, the first device and the second device are configured with a synchronized timing signal; and the step of one device of the first device and the second device sending an ACK packet to the audio data source includes:

the first device sending the ACK packet to the audio data source when the timing signal satisfies a predetermined first condition; and the second device sending the ACK packet to the audio data source when the timing signal satisfies a predetermined second condition, wherein the predetermined first condition and the predetermined second condition are mutually exclusive.

Optionally, in the audio system data synchronization method of an embodiment of the present disclosure, both the first device and the second device are configured with a count value for recording the number of successful receiving of the two devices; and the step of one device of the first device and the second device sending an ACK packet to the audio data source includes:

if the count value is an odd number, the first device sending the ACK packet to the audio data source; and if the count value is an even number, the second device sending the ACK packet to the audio data source.

Optionally, in the audio system data synchronization method of an embodiment of the present disclosure, the step that one device of the first device and the second device whose receiving is failed sends a first special acknowledge packet in the n-th cycle if the receiving of the first device and/or the second device is failed includes:

the first device sending, if receiving is failed in the n-th cycle, the first special acknowledge packet at a first time point of the n-th cycle; making the audio data source re-send the audio data in the n+1-th cycle after receiving the NAK packet in the first special acknowledge packet; and making the second device stop sending a signal in the n-th cycle after receiving the first additional field in the first special acknowledge packet, and receive the re-sent audio data packet in synchronization with the first device in the n+1-th cycle.

Optionally, in the audio system data synchronization method of an embodiment of the present disclosure, the step that one device of the first device and the second device whose receiving is failed sends a first special acknowledge packet in the n-th cycle if the receiving of the first device and/or the second device is failed includes:

if receiving is failed and not receiving the first additional field in the first special acknowledge packet sent by the first device at the first time point of the n-th cycle, the second device sending the first special acknowledge packet at a second time point of the n-th cycle; making the audio data source re-send the audio data in the n+1-th cycle after receiving the NAK packet in the first special acknowledge packet; and making the first device stop sending a signal in the n-th cycle after receiving the first additional field in the first special acknowledge packet, and receive in the n+1-th cycle the re-sent audio data packet in synchronization with the second device, wherein the second time point is later than the first time point.

Optionally, in the audio system data synchronization method of an embodiment of the present disclosure, the method further includes:

when sending the synchronization information to the second device in a k+1-th cycle, the first device sending a second special acknowledge packet at a third time point of a k-th cycle, wherein the second special acknowledge packet includes a second additional field; making the second device stop sending a signal in the k-th cycle according to the second additional field in the second special acknowledge packet, and exchange synchronization information in the k+1-th cycle according to a link rule of the first device and the second device, wherein the synchronization information is control information or data information.

Optionally, in the audio system data synchronization method of an embodiment of the present disclosure, the method further includes:

when the second device is to send the synchronization information to the first device in a k+1-th cycle, if the second device does not receive a second additional field in a second special acknowledge packet sent by the first device at a third time point of a k-th cycle, the second device sending the second special acknowledge packet at a fourth time point of the k-th cycle; making the first device exchange, according to the second additional field in the second special acknowledge packet sent by the second device, the synchronization information in the k+1-th cycle according to the link rule of the first device and the second device, wherein the synchronization information is control information or data information. Optionally, the link rule includes a near-field communication link rule, and the near-field communication link rule includes a Bluetooth link rule and/or a WIFI link rule.

Optionally, the step of the first device receiving an audio data packet sent by the audio data source in an n-th cycle includes: the first device receiving the audio data packet from an air interface in the n-th cycle, wherein the audio data packet is pre-sent by the audio data source to the air interface.

Optionally, the step of the second device receiving the audio data packet sent by the audio data source in the n-th cycle includes: the second device receiving the audio data packet from the air interface in the n-th cycle, wherein the audio data packet is pre-sent by the audio data source to the air interface.

Optionally, the step that one device of the first device and the second device whose receiving is failed sends a first special acknowledge packet in the n-th cycle includes: one device of the first device and the second device whose receiving is failed sending the first special acknowledge packet to the air interface in the n-th cycle, so that the other device of the first device and the second device and the audio data source receive the first special acknowledge packet from the air interface.

Optionally, the first device and the second device receive the audio data packet on a same receiving time slot.

Optionally, after receiving in the n+1-th cycle the audio data packet re-sent by the audio data source in synchronization with the device whose receiving is failed, the method includes: the other device judging whether the received audio data packet re-sent by the audio data source is the same as the audio data packet previously received, wherein if same, the audio data packet re-sent by the audio data source is deleted.

Optionally, the step of one device of the first device and the second device sending an ACK packet to the audio data source further includes: only one device of the first device and the second device sending the ACK packet to the audio data source.

An embodiment of the present disclosure further provides an audio component, including a first device and a second device, wherein the audio component stores computer readable instructions, and when the computer readable instructions are executed by the audio component, the method according to any one of the above is run.

Optionally, in the audio component of an embodiment of the present disclosure, the first device and the second device are earphones; or the first device and the second device are loudspeaker boxes.

An embodiment of the present disclosure further provides an audio system data synchronization method, wherein the audio system includes an audio data source, a first device, and a second device; and the method is applied to the first device, and includes:

receiving an audio data packet sent by the audio data source in an n-th cycle, and judging whether receiving is successful;

sending, if the receiving fails, a first special acknowledge packet, wherein the first special acknowledge packet includes a first additional field and an NAK packet, making the audio data source re-send, after receiving the NAK packet, the audio data packet in an n+1-th cycle, and making the second device, after receiving the first additional field, stop sending a signal in the n-th cycle and receive in the n+1-th cycle the audio data packet re-sent by the audio data source in synchronization with the first device; and sending an ACK packet to the audio data source in cases where the second device does not send an ACK packet, if the receiving is successful and the NAK packet in the first special acknowledge packet sent by the second device is not received in the n-th cycle.

An embodiment of the present disclosure further provides an audio system data synchronization method, wherein the audio system includes an audio data source, a first device, and a second device; and the method is applied to the second device, and includes:

receiving an audio data packet sent by the audio data source in an n-th cycle, and judging whether receiving is successful;

sending, if the receiving fails and the NAK packet sent by the first device is not received, a first special acknowledge packet at a second time point of the n-th cycle, making the audio data source re-send the audio data packet in an n+1-th cycle according to the NAK packet in the first special acknowledge packet, and making the first device receive, in synchronization with the second device, the audio data packet re-sent by the audio data source in the n+1-th cycle according to the first additional field in the first special acknowledge packet, wherein the second time point is later than the first time point; and sending an ACK packet to the audio data source in cases where the first device does not send the ACK packet, if the receiving is successful and the NAK packet sent by the first device is not received in the n-th cycle.

An embodiment of the present disclosure provides a storage medium, stored thereon with computer programs, wherein the computer programs, when being executed by a processor, run the steps of the methods provided in the above embodiments of the present disclosure.

It may be seen from the above that in the embodiments of the present disclosure, the first device receives the audio data packet sent by the audio data source in the n-th cycle, and judges whether the receiving is successful; the second device receives the audio data packet sent by the audio data source in the n-th cycle, and judges whether receiving is successful; if the receiving of the first device and/or the second device is failed, one device of the first device and the second device whose receiving is failed sends the first special acknowledge packet in the n-th cycle, wherein the first special acknowledge packet includes the first additional field and the NAK packet; after receiving the NAK packet, the audio data source is made to re-send the audio data packet in the n+1-th cycle; after receiving the first additional field, the other device is made to stop sending the signal in the n-th cycle, and receive, in synchronization with the device whose receiving is failed, in the n+1-th cycle the audio data packet re-sent by the audio data source, thus interference occurring between feedback packets caused by the fact that the two devices both send the NAK packet may be avoided, synchronism of the audio data may be improved, and the power consumption may be reduced as the NAK packet is only sent once.

Other features and advantages of the present disclosure will be illustrated in the following description, and will partially become obvious from the description, or understood by implementing the embodiments of the present disclosure. The objectives and other advantages of the present disclosure may be achieved and obtained through the structures specifically indicated in the description, the claims, and the accompanying drawings.

BRIEF DESCRIPTION OF DRAWINGS

In order to more clearly illustrate technical solutions of embodiments of the present disclosure, accompanying drawings which need to be used in the embodiments of the present disclosure will be introduced below briefly, and it should be understood that the accompanying drawings below merely show some embodiments of the present disclosure, and therefore should not be considered as limitation on the scope, and a person ordinarily skilled in the art still could obtain other relevant accompanying drawings according to these accompanying drawings, without using any creative efforts.

DETAILED DESCRIPTION OF EMBODIMENTS

The technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in different configurations. Therefore, the detailed description below of the embodiments of the present disclosure provided in the accompanying drawings is not intended to limit the scope of protection of the present disclosure, but merely represents chosen embodiments of the present disclosure. Based on the embodiments of the present disclosure, all of other embodiments obtained by a person skilled in the art without using creative efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings. Meanwhile, in the description of the present disclosure, terms such as "first" and "second" are merely for distinctive description, but should not be construed as indicating or implying importance in relativity.

Figure 1:
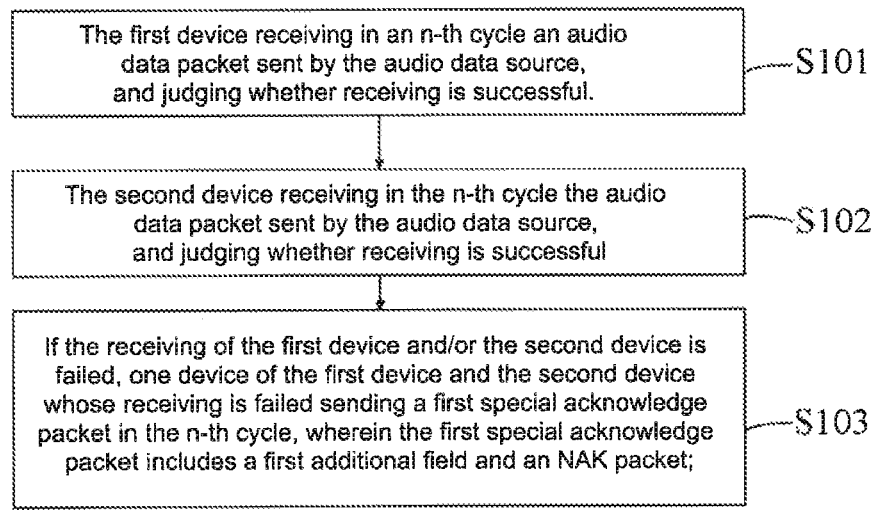
FIG. 1 is a first flowchart of an audio system data synchronization method provided in an embodiment of the present disclosure.
Figure 2:
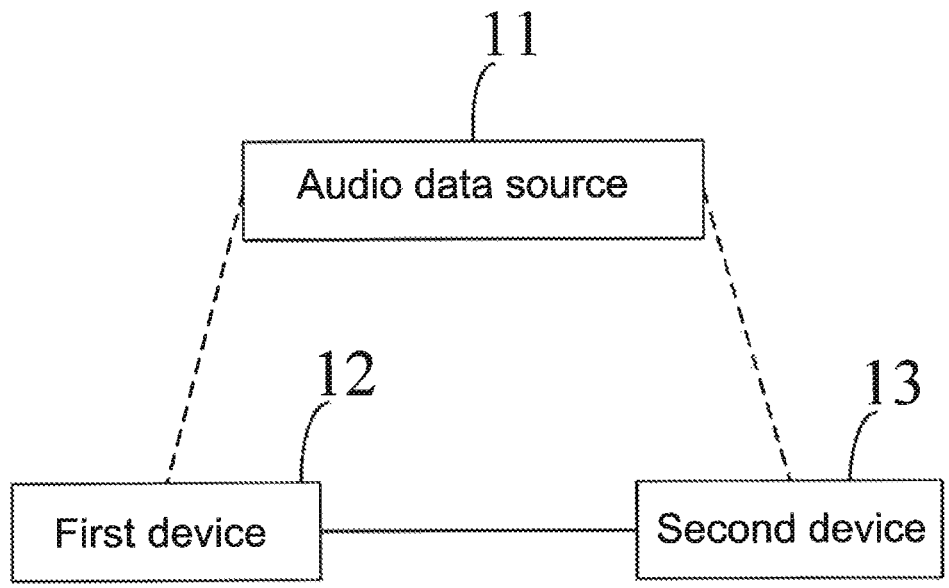
FIG. 2 is a structural schematic view of an audio system in an embodiment of the present disclosure.

Referring to FIG. 1, FIG. 1 is a flowchart of an audio system data synchronization method in an embodiment of the present disclosure. In the above, as shown in FIG. 2, the audio system may include an audio data source 11, a first device 12, and a second device 13. In the above, this method may be integrated in the first device 12 and the second device 13 in a form of a computer program. The audio data source 11 may be a mobile phone, a PAD or a computer etc. The first device 12 and the second device 13 may be earphones, respectively, or the first device 12 and the second device 13 also may be loudspeaker boxes, respectively. Optionally, the first device 12 and the audio data source 11 may establish a Bluetooth connection therebetween. After the first device 12 and the second device 13 establish the connection and exchange necessary information for the Bluetooth connection, both the first device 12 and the second device 13 may exchange data with the audio data source 11 through a Bluetooth link. However, for the audio data source 11, there is only one Bluetooth link with the first device 12 and the second device 13 at a single moment.

Optionally, the first device 12 and the second device 13 may be connected through a Bluetooth link or other wireless links.

In the above, the audio system data synchronization method may include the following steps.

S101, the first device receives an audio data packet sent by the audio data source in an nth cycle, and judges whether receiving is successful.

S102, the second device receives the audio data packet sent by the audio data source in the nth cycle, and judges whether receiving is successful.

S103, if the receiving of the first device and/or the second device is failed, one device of the first device and the second device whose receiving is failed sends a first special acknowledge packet in the n-th cycle, wherein the first special acknowledge packet includes a first additional field and an NAK packet; after receiving the NAK packet in the first special acknowledge packet, the audio data source is made to re-send the audio data packet in an n+1-th cycle; and after receiving the first additional field in the first special acknowledge packet, the other device is made to stop sending a signal in the nth cycle and receive in the n+1-th cycle the audio data packet re-sent by the audio data source, in synchronization with the device whose receiving is failed.

In the above, n is a positive integer. The cycle may be a cycle of receiving and sending the audio data, and each cycle may include one audio data transmission time slot and one audio data receiving time slot.

Optionally, the step S101 and the step S102 are performed in synchronization.

Optionally, the step that the first device receives an audio data packet sent by the audio data source in an n-th cycle includes: the first device receiving the audio data packet from an air interface in the n-th cycle, wherein the audio data packet is pre-sent by the audio data source to the air interface.

Optionally, the step that the second device receives the audio data packet sent by the audio data source in the n-th cycle includes: the second device receiving the audio data packet from the air interface in the n-th cycle, wherein the audio data packet is pre-sent by the audio data source to the air interface. In an embodiment of the present disclosure, in the step S101 and the step S102, the audio data source may pre-send the audio data packet to the air interface (also referred to as "air interface"), and the first device and the second device may receive the audio data packet from the air interface at a preset moment of the n-th cycle. Optionally, successful receiving of the audio data packet means that the audio data packet is completely received and parsing is completed correctly, and failed receiving means that the receiving of the audio data packet is incomplete or the parsing is wrong.

Optionally, the step that one device of the first device and the second device whose receiving is failed sends a first special acknowledge packet in the n-th cycle includes: one device of the first device and the second device whose receiving is failed sending the first special acknowledge packet to the air interface in the n-th cycle, so that the audio data source and the other device of the first device and the second device receive the first special acknowledge packet from the air interface.

In the embodiment of the present disclosure, in the step S103, if the receiving of the first device is failed and the second device successfully receives, or the first device successfully receives and the receiving of the second device is failed, or both the first device and the second device fail to receive, one device of the first device and the second device whose receiving is failed may send the first special acknowledge packet to the air interface in the nth cycle, to be received by the other device and the audio data source.

The structure of the first special acknowledge packet is specifically as shown in the following table:

| Ext-preamble | Access CODE | Header | Payload Data |
|---|---|---|---|

In the above, the first additional field is Ext-preamble field in the table above. Optionally, if it is the first additional field sent by the first device to the second device, a front L1 field of the Ext-preamble field is a field indicating whether the first device successfully receives, and a back L2 field of the Ext-preamble field is an empty field (for example, filled with 0). Optionally, if it is the first additional field sent by the second device to the first device, a length of the Ext-preamble field is L2, and the Ext-preamble field is a field indicating whether the second device successfully receives.

Optionally, the NAK packet is composed of three fields (Access CODE segment, Header segment, and Payload Data segment) behind the Ext-preamble field.

Optionally, in the present disclosure, each cycle includes a transmission time slot and a receiving time slot. Optionally, for the audio data source, it may transmit the audio data packet in the transmission time slot. Optionally, the audio data source may receive in the receiving time slot the ACK packet or the NAK packet in the first special acknowledge packet sent by the first device or the second device.

Further, in an embodiment of the present disclosure, the step S103 may include the following substeps.

S1031, if receiving is failed in the n-th cycle, the first device sends the first special acknowledge packet at a first time point of the n-th cycle; the audio data source is made to re-send the audio data in the n+1-th cycle after receiving the NAK packet in the first special acknowledge packet; and the second device is made to stop sending a signal in the n-th cycle after receiving the first additional field in the first special acknowledge packet, and receive the re-sent audio data packet in synchronization with the first device in the n+1-th cycle.

S1032, if receiving is failed and not receiving the first additional field in the first special acknowledge packet sent by the first device at the first time point of the n-th cycle, the second device sends the first special acknowledge packet at a second time point of the n-th cycle; the audio data source is made to re-send the audio data in the n+1-th cycle after receiving the NAK packet in the first special acknowledge packet; and the first device is made to stop sending a signal in the n-th cycle after receiving the first additional field in the first special acknowledge packet, and receive in the n+1-th cycle the re-sent audio data packet in synchronization with the second device, wherein the second time point is later than the first time point.

Figure 3:
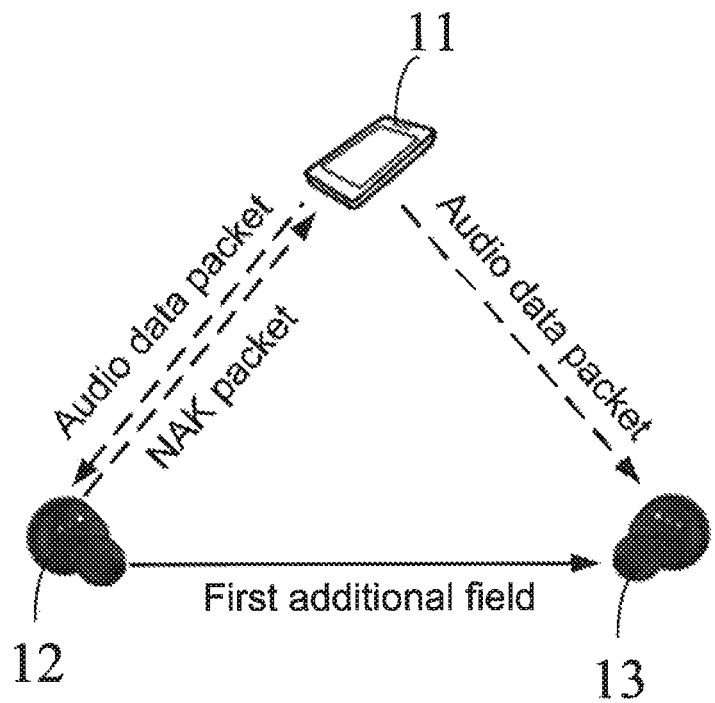
FIG. 3 is a schematic view of a first scenario of the audio system provided in an embodiment of the present disclosure.
Figure 4:
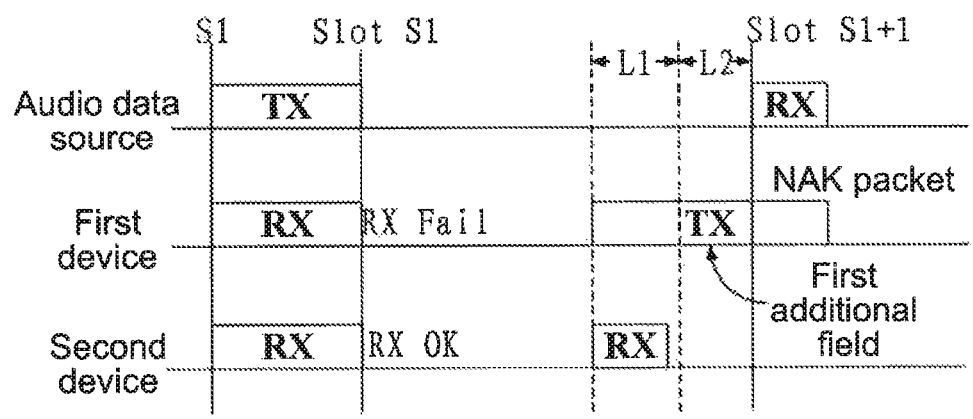
FIG. 4 is a timing diagram of the audio system shown in FIG. 3 provided in an embodiment of the present disclosure.

Optionally, in the step S1031, as shown in FIG. 3 and FIG. 4, the audio data source may send the audio data packet in a TX time slot (transmission time slot) thereof, and the first device 12 and the second device 13 may receive the audio data packet in the same time period (namely, RX time slot, i.e., receiving time slot). If the receiving of the first device 12 is failed, and the second device 13 successfully receives, the first device 12 may transmit the first special acknowledge packet to the air interface at the first time point of the n-th cycle. As the length of the first additional field in the first special acknowledge packet is L1+L2, in order to enable the audio data source to just receive the NAK packet without receiving the first additional field and enable the second device just receive the first additional field without receiving the NAK packet, the first device should start to transmit the first special acknowledge packet at (SlotS1+1)−L1−L2, i.e., the first time point, the second device opens an RX window between (SlotS1+1)−L1−L2 and (SlotS1+1)−L2 to receive the front L1 field in the first additional field, and the audio data source opens a receiving window at the time point SlotS1+1 to receive the NAK packet in the first special acknowledge packet. The audio data source 11 will recognize the NAK packet after receiving the NAK packet in the first acknowledge packet, so as to learn that there is one device of the first device 12 and the second device 13 whose receiving is failed, and thus re-send the audio data packet that fails to be received, in the transmission time slot of the n+1-th cycle. The second device 13 learns that the receiving of the first device 12 is failed after receiving the first additional field in the first special acknowledge packet, and therefore, will close a signal receiving and a signal transmission window from the time recognizing the first additional field to the end of the n-th cycle, and may open the signal receiving window in the n+1-th cycle to re-receive the audio data packet at the air interface in synchronization with the first device. Optionally, if the second device determines that the audio data packet is a received audio data packet, the audio data packet may be automatically deleted or ignored.

Figure 5:
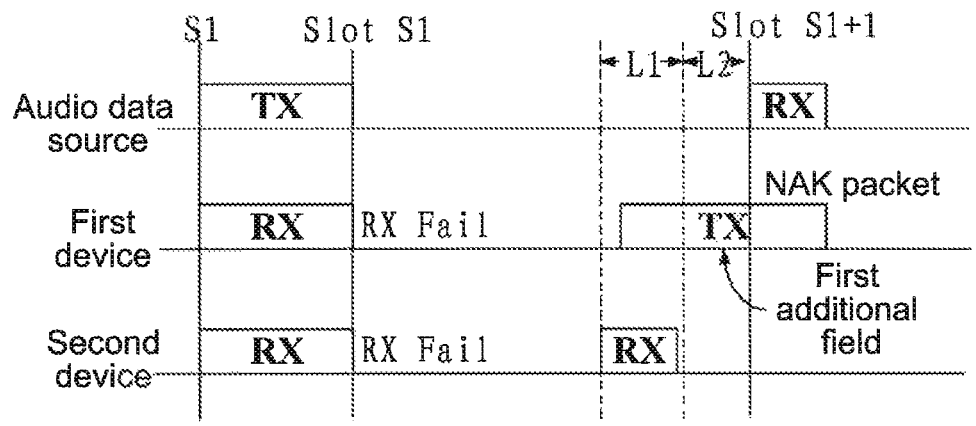
FIG. 5 is another timing diagram of the audio system shown in FIG. 3 provided in an embodiment of the present disclosure.

As shown in FIG. 3 and FIG. 5, both the first device 12 and the second device 13 both fail to receive. The audio data source may send the audio data packet in the TX time slot (transmission time slot) thereof, and the first device 12 and the second device 13 may receive the audio data packet in the same time period (RX time slot, i.e., receiving time slot). If the receiving of the first device 12 is failed and the receiving of the second device 13 is failed, the first device 12 may transmit the first special acknowledge packet to the air interface at the first time point of the n-th cycle. As the length of the first additional field in the first special acknowledge packet is L1+L2, the second device opens the RX window between (SlotS1+1)−L1−L2 and (SlotS1+1)−L2 to receive the front L1 field in the first additional field, and the audio data source opens the receiving window at the time point SlotS1+1 to receive the NAK packet in the first special acknowledge packet. The audio data source 11 will recognize the NAK packet after receiving the NAK packet in the first acknowledge packet, so as to learn that there is a device of the first device 12 and the second device 13 whose receiving is failed, and thus re-send, in the transmission time slot of the n+1-th cycle, the audio data packet that fails to be received. The second device 13 learns that the receiving of the first device 12 is failed, after receiving the first additional field in the first special acknowledge packet, and therefore, will close the signal receiving and the signal transmission window from the time recognizing the first additional field to the end of the n-th cycle, and may open the signal receiving window in the n+1-th cycle to re-receive the audio data packet at the air interface in synchronization with the first device, wherein if the second device determines that the audio data packet is a received audio data packet, the audio data packet may be automatically deleted or ignored.

Figure 6:
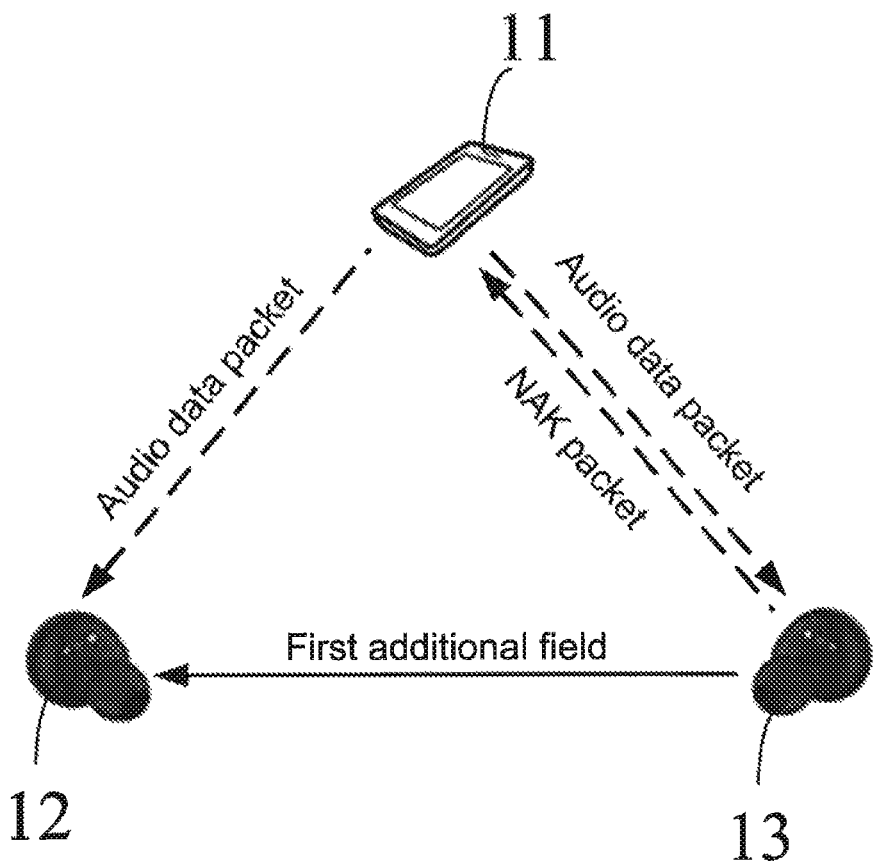
FIG. 6 is a schematic view of a second scenario of the audio system provided in an embodiment of the present disclosure.
Figure 7:
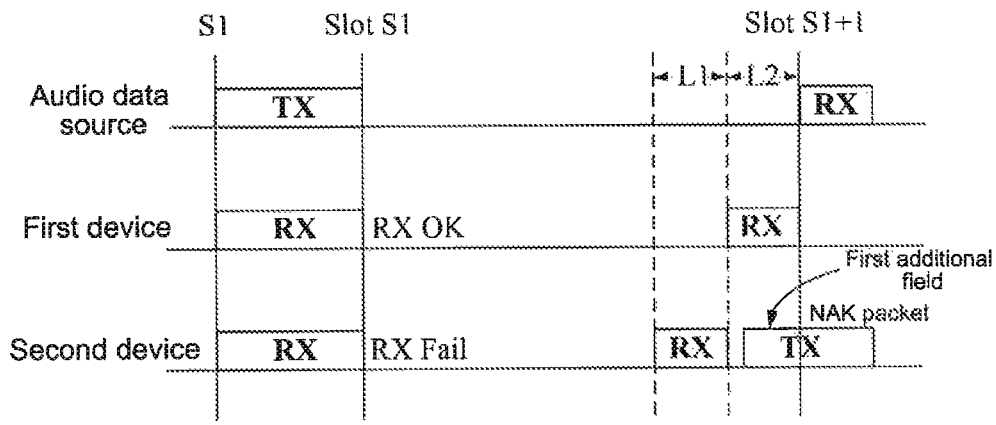
FIG. 7 is a timing diagram of the audio system shown in FIG. 6 provided in an embodiment of the present disclosure.
Figure 8:
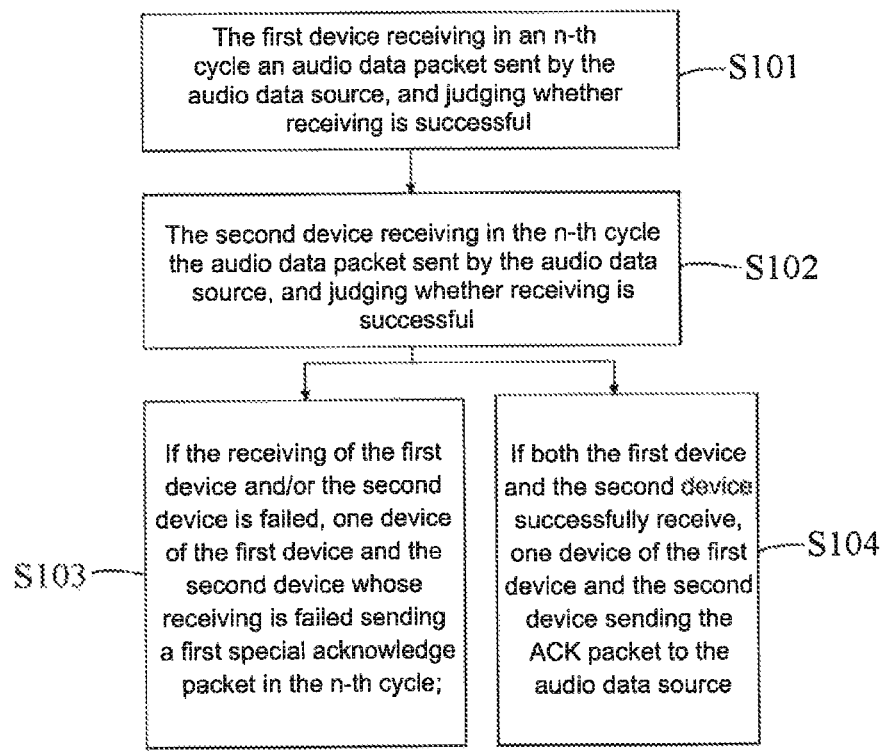
FIG. 8 is a second flowchart of the audio system data synchronization method provided in an embodiment of the present disclosure.

Optionally, in the step S1032, as shown in FIG. 6 and FIG. 7, the first device 12 successfully receives, and the receiving of the second device 13 is failed. The audio data source may send the audio data packet in the TX time slot (transmission time slot) thereof, and the first device 12 and the second device 13 may receive the audio data packet in the same time period (RX time slot, i.e., receiving time slot), If the first device 12 successfully receives and the receiving of the second device 13 is failed, the second device 13 may transmit the first special acknowledge packet to the air interface at the second time point ((SlotS1+1)−L2) of the n-th cycle. As the length of the first additional field in the first special acknowledge packet is L2, the first device opens the RX window between (SlotS1+1)−L2 and (SlotS1+1) to receive the L2 field in the first additional field, and the audio data source opens the receiving window at the time point SlotS1+1 to receive the NAK packet in the first special acknowledge packet. The audio data source 11 will recognize the NAK packet after receiving the NAK packet in the first acknowledge packet, so as to learn that there is a device of the first device 12 and the second device 13 whose receiving is failed, and thus re-send, in the transmission time slot of the n+1-th cycle, the audio data packet that fails to be received. The first device 12 learns that the receiving of the second device 13 is failed, after receiving the first additional field in the first special acknowledge packet, and therefore, from the time recognizing the first additional field to the end of the n-th cycle, will close the signal receiving and the signal transmission window, and may open the signal receiving window in the n+1-th cycle to re-receive the audio data packet at the air interface in synchronization with the second device, wherein if the first device determines that the audio data packet is a received audio data packet, the audio data packet may be automatically deleted or ignored As shown in FIG. 8, in an embodiment of the present disclosure, after the step S101 and the step S102, the following steps may further be included.

S104, if both the first device and the second device successfully receive, one device of the first device and the second device sends the ACK packet to the audio data source, and the audio data source is made to send a next audio data packet in the n+1-th cycle according to the ACK packet.

Figure 9:
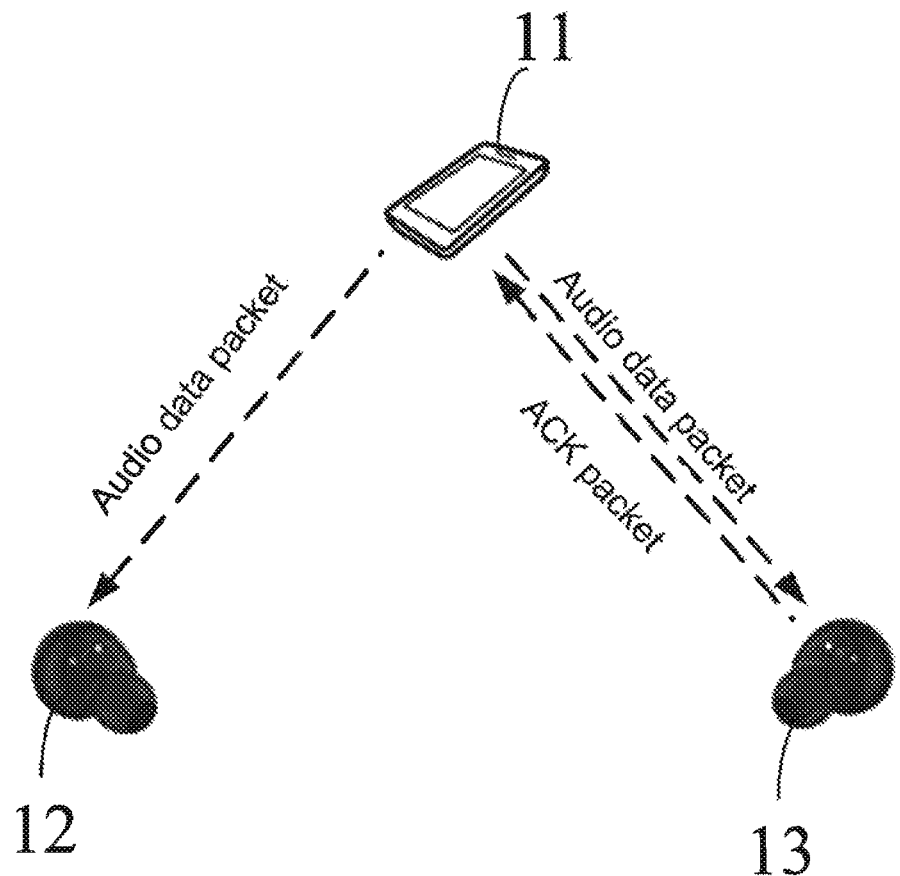
FIG. 9 is a schematic view of a third scenario of the audio system provided in an embodiment of the present disclosure.
Figure 10:
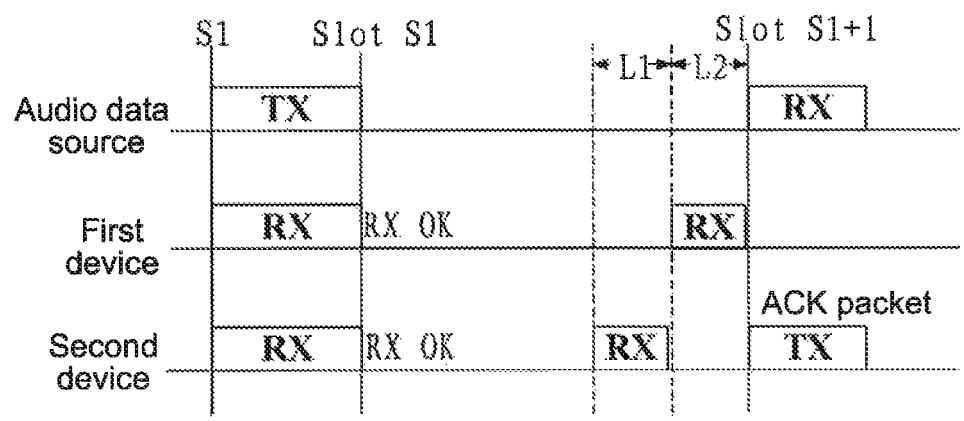
FIG. 10 is a timing diagram of the audio system shown in FIG. 9 provided in an embodiment of the present disclosure.
Figure 11:
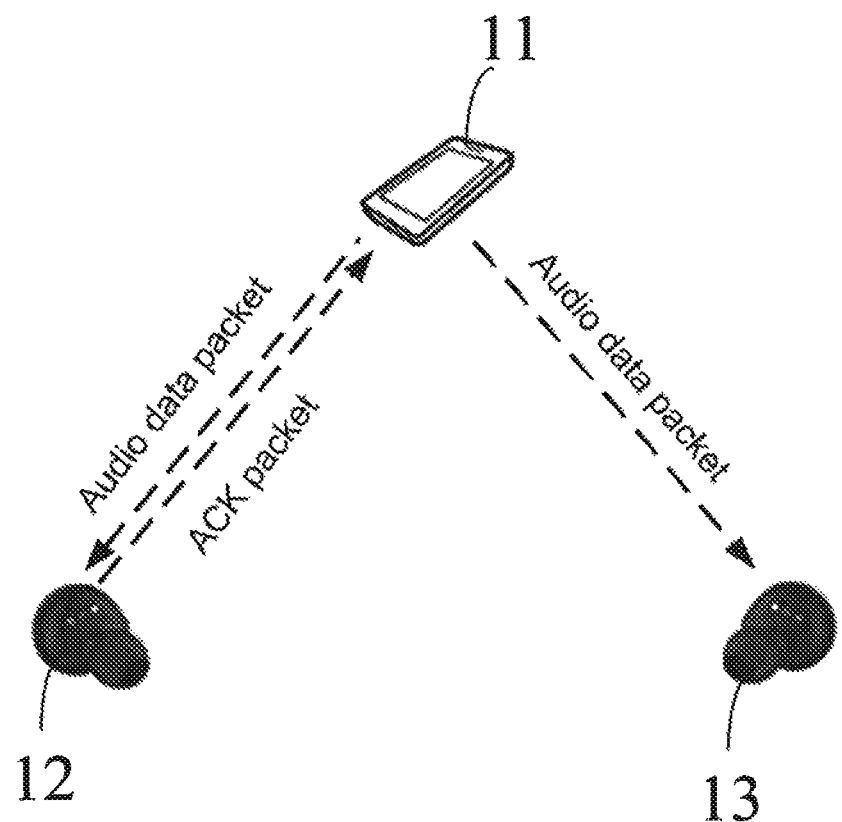
FIG. 11 is a schematic view of a fourth scenario of the audio system provided in an embodiment of the present disclosure.
Figure 12:
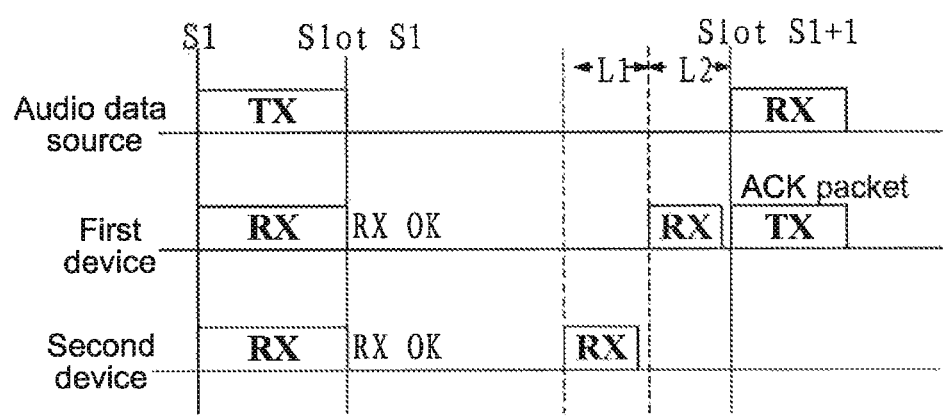
FIG. 12 is a timing diagram of the audio system shown in FIG. 10 provided in an embodiment of the present disclosure.

Optionally, in the step S104, generally, the first device and the second device alternately send the ACK packet to the audio data source. Optionally, there is only one device of the first device and the second device that sends the ACK packet to the audio data source. Specifically, for example, the ACK packet may be transmitted by one of the devices: as shown in FIG. 9 and FIG. 10, the second device is adopted to send the ACK packet; and as shown in FIG. 11 and FIG. 12, the first device is adopted to send the ACK packet.

Optionally, if the first device successfully receives and does not receive, at the second time point of the n-th cycle, the first additional field in the first special acknowledge packet sent by the second device, it may be determined that both devices successfully receive. In the above, if the second device successfully receives and does not receive, at the first time point of the n-th cycle, the first additional field in the first special acknowledge packet sent by the first device, it may be determined that both devices successfully receive. In an embodiment of the present disclosure, when both devices successfully receive, by setting an algorithm to enable only one of the two devices to send the ACK packet, the power consumption may be thereby reduced, and signal interference also may be avoided.

In an embodiment of the present disclosure, both the first device and the second device are configured with a count value for recording the number of successful receiving of the two devices; and the step that one device of the first device and the second device sends the ACK packet to the audio data source may include:

S1041, if the count value is an odd number, the first device sending the ACK packet to the audio data source, and S1042, if the count value is an even number, the second device sending the ACK packet to the audio data source. Certainly, it is not limited thereto, and it is also feasible that when the count value is an even number, the first device sends the ACK packet, and when the count value is an odd number, the second device sends the ACK packet.

In the present embodiment, the count value determines which device of the first device and the second device sends the ACK packet, so that the number of times that the first device and the second device send the ACK packet may be balanced, then the balance of power consumption of the first device and the second device may be improved.

In an embodiment of the present disclosure, both the first device and the second device are configured with a synchronized timing signal; and the step that one device of the first device and the second device sends the ACK packet to the audio data source includes:

S1043, the first device sending the ACK packet to the audio data source when the timing signal satisfies a predetermined first condition; S1044, the second device sending the ACK packet to the audio data source when the timing signal satisfies a predetermined second condition, wherein the predetermined first condition and the predetermined second condition are mutually exclusive. For example, when the timing signal is an odd number, the first device sends the ACK packet, and when the timing signal is an even number, the second device sends the ACK packet. Alternatively, it is also feasible that when the end of the timing signal is 0-4, the first device sends the ACK signal, and when the end of the timing signal is 5-9, the second device sends the ACK signal, which is certainly not limited thereto. By realizing the selection of the device for sending the ACK packet based on the timing signal, the present disclosure may improve the efficiency, without the need of additionally setting other signals for judgment.

In an embodiment of the present disclosure, the audio system data synchronization method further may include the following steps:

when sending synchronization information to the second device in a k+1-th cycle, the first device sends a second special acknowledge packet at a third time point of a k-th cycle, wherein the second special acknowledge packet includes a second additional field; the second device is made to stop sending a signal in the k-th cycle according to the second additional field in the second special acknowledge packet, and exchange the synchronization information in the k+1-th cycle according to a link rule of the first device and the second device, wherein the synchronization information is control information or data information. In the above, k is a positive integer. It should be noted that here, the second special acknowledge packet may include the NAK packet or may not include the NAK packet.

Optionally, the third time point and the first time point are the same time point.

When the second device needs to send the synchronization information to the first device in the k+1-th cycle, if the second device does not receive the second additional field in the second special acknowledge packet sent by the first device at the third time point of the k-th cycle, the second device sends the second special acknowledge packet at a fourth time point of the k-th cycle; the first device is made to exchange the synchronization information according to the link rule of the first device and the second device in the k+1-th cycle according to the second additional field in the second special acknowledge packet sent by the second device, where k is a positive integer. It should be noted that the second special acknowledge packet herein may include the NAK packet or may not include the NAK packet, and the synchronization information is control information or data information. In the above, the link rule may be rule of a Bluetooth link, may also be a WIFI link rule, or may also be other near-field communication link rules.

Optionally, the fourth time point and the second time point are the same time point.

Optionally, the synchronization information may be a control instruction, for example, when the first device adjusts its own sound volume, the first device may synchronize to the second device the instruction for adjusting the sound volume, so that the second device synchronously adjusts the volume, and if the first device adjusts a playing speed, the first device will synchronize to the second device the instruction for adjusting the playing speed, so that the second device synchronously adjusts the playing speed. Certainly, if the second device adjusts the sound volume or the playing speed, the corresponding control instruction also will be synchronized to the first device, so that the two perform synchronous adjustment.

Furthermore, by setting the time for the first device and the second device to synchronize information to be different time points, instruction collision between the two may be thus avoided, and interference brought about by the fact that the first device and the second device synchronize information at the same time may be avoided.

Optionally, the structure of the second special acknowledge packet is similar to the format of the first special acknowledge packet. If it is the second additional field sent by the first device to the second device, the front L1 field of the Ext-preamble field is an instruction indicating whether the first device needs to perform information synchronization, and the back L2 field of the Ext-preamble field is an empty field (for example, filled with 0). Optionally, if it is the second additional field sent by the second device to the first device, the Ext-preamble field has a length of L2, and it is used to indicate an instruction of whether the second device needs to perform information synchronization. In the above, the NAK packet or the ACK packet is composed of three fields (Access CODE segment, Header segment, and Payload Data segment) behind the Ext-preamble field.

Figure 13:
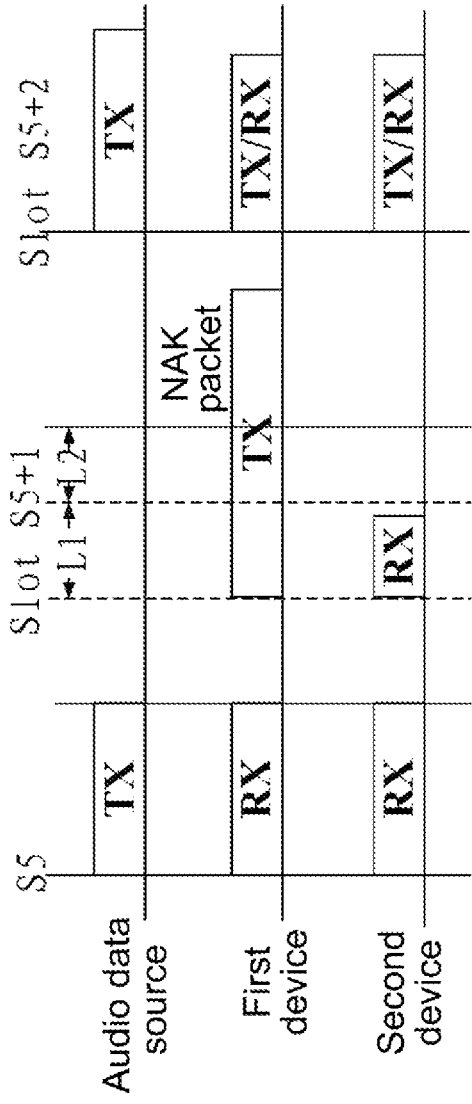
FIG. 13 is a timing diagram of the audio system provided in an embodiment of the present disclosure.

As shown in FIG. 13, the audio data source sends the audio data packet to the air interface in the transmission time slot of the k-th cycle, and the first device and the second device respectively receive the audio data packet from the air interface at a same time point Slot S5. No matter the first device and the second device both successfully receive or fail to receive, if the first device has control or synchronization information that needs to be sent to the second device, the first device will send the second special acknowledge packet at the next first time point, i.e., (SlotS5+1)−L1−L2), wherein the second additional field of the second special acknowledge packet is between (SlotS5+1)−L1−L2 and (SlotS5+1), and the NAK packet in the second special acknowledge packet is located behind the time point (SlotS5+1). When parsing the front L1 field in the second additional field of the special second special acknowledge packet, the second device will stop signal receiving and signal sending. At the next time point Slot (Slot S5+2), the first device may exchange the synchronization information on the Bluetooth link or other links established by the first device and the second device.

Figure 14:
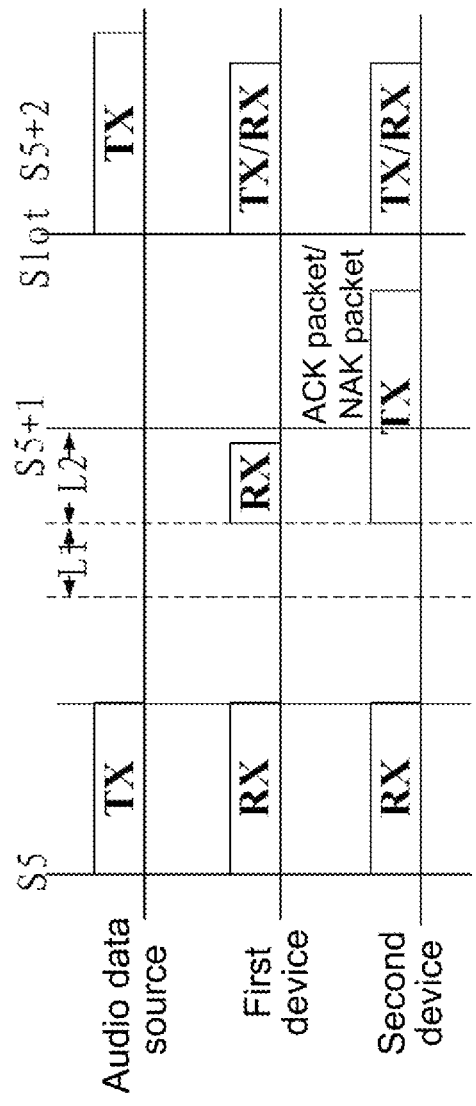
FIG. 14 is another timing diagram of the audio system provided in an embodiment of the present disclosure.

As shown in FIG. 14, the audio data source sends the audio data packet to the air interface in the transmission time slot of the k-th cycle, and the first device and the second device respectively receive the audio data packet from the air interface at the same time point Slot S5. If the second device has control or synchronization information that needs to be sent to the first device, and if the second device does not receive the special acknowledge packet of the first device at the first time point, the second device will send the second special acknowledge packet at the next second time point, i.e., (SlotS5+1)−L2, wherein the second additional field of the second special acknowledge packet is between (SlotS5+1)−L2 and (SlotS5+1), and the ACK packet or the NAK packet in the second special acknowledge packet is located behind the time point (SlotS5+1). When parsing the second additional field of the second special acknowledge packet, the first device will stop signal receiving and signal sending. At the next time point Slot (Slot S5+2), the second device may exchange the synchronization information with the first device. In the above, in the present disclosure, the NAK packet is a feedback packet generated when the receiving fails, and the ACK packet is a feedback packet generated when the receiving succeeds. Based on the basic rule of Bluetooth communication, the audio data source may re-send the audio data packet of the current cycle in the next cycle after receiving the NAK packet. The audio data source may re-send in the next cycle the next audio data packet of the audio data packet of the current cycle after receiving the ACK packet.

It may be seen from the above that in the audio system data synchronization method provided in the embodiment of the present disclosure, the first device receives the audio data packet sent by the audio data source in the n-th cycle, and judges whether the receiving is successful; the second device receives the audio data packet sent by the audio data source in the n-th cycle, and judges whether receiving is successful; if the receiving of the first device and/or the second device is failed, one device of the first device and the second device whose receiving is failed sends the first special acknowledge packet in the n-th cycle, wherein the first special acknowledge packet includes the first additional field and the NAK packet; after receiving the NAK packet, the audio data source is made to re-send the audio data packet in the n+1-th cycle; after receiving the first additional field, the other device is made to stop sending the signal in the n-th cycle, and receive in the n+1-th cycle the audio data packet re-sent by the audio data source, in synchronization with the device whose receiving is failed, so that when the two audio devices fail to receive, only one device sends one NAK packet, which not only may inform the other device, but also may simultaneously inform the audio data source, thus signal interference caused by the fact that the two devices both send the NAK packet may be avoided. As only one device sends the NAK packet, the power consumption may be reduced, interference occurring between feedback packets sent by two devices may be avoided, and synchronism of the audio data may be improved.

Figure 15:
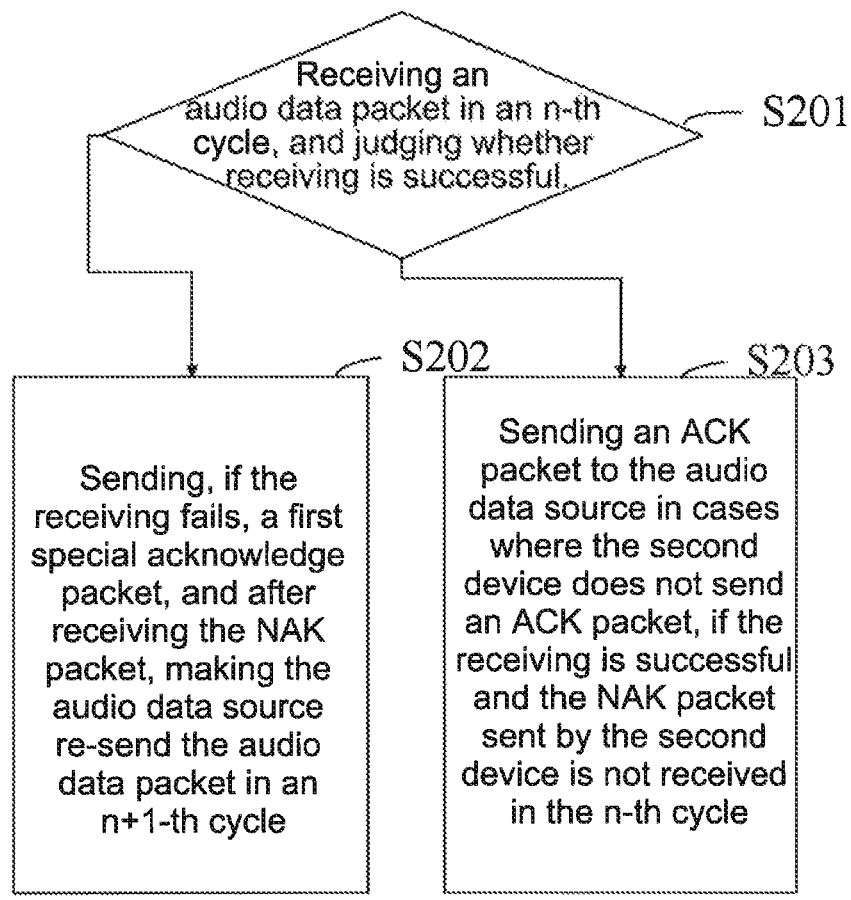
FIG. 15 is a third flowchart of the audio system data synchronization method provided in an embodiment of the present disclosure.

As shown in FIG. 15, an embodiment of the present disclosure further provides an audio system data synchronization method, wherein the audio system includes an audio data source, a first device, and a second device; and the method is applied to the first device, and includes:

S201, receiving an audio data packet sent by the audio data source in an n-th cycle, and judging whether receiving is successful.

S202, sending, if the receiving fails, a first special acknowledge packet, wherein the first special acknowledge packet includes a first additional field and an NAK packet, making, after receiving the NAK packet, the audio data source re-send the audio data packet in an n+1-th cycle, and making, after receiving the first additional field, the second device stop sending a signal in the n-th cycle and receive in the n+1-th cycle the audio data packet re-sent by the audio data source, in synchronization with the first device.

S203, sending an ACK packet to the audio data source in cases where the second device does not send an ACK packet, if the receiving is successful and the NAK packet in the first special acknowledge packet sent by the second device is not received in the n-th cycle.

In the above, the specific contents of the step S201 to the step S203 are already described in detail in the above embodiments, and thus are not repeatedly described herein again.

Figure 16:
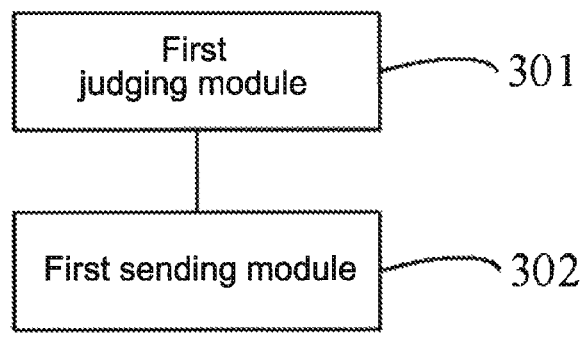
FIG. 16 is a first structural view of an audio system data synchronization device provided in an embodiment of the present disclosure.

As shown in FIG. 16, an embodiment of the present disclosure further provides an audio system data synchronization device, wherein the audio system includes an audio data source, a first device, and a second device; and the audio system data synchronization device is used in the first device, and includes: a first judging module 301 and a first sending module 302.

In the above, the first judging module 301 is configured to receive an audio data packet sent by the audio data source in an n-th cycle, and judge whether receiving is successful.

In the above, the first sending module 302 is configured to send, if the receiving fails, a first special acknowledge packet, wherein the first special acknowledge packet includes a first additional field and an NAK packet; make, after receiving the NAK packet, the audio data source re-send the audio data packet in an n+1-th cycle; and make, after receiving the first additional field, the second device stop sending a signal in the n-th cycle and receive in the n+1-th cycle the audio data packet re-sent by the audio data source, in synchronization with the first device. The first sending module 302 is further configured to send an ACK packet to the audio data source in cases where the second device does not send the ACK packet, if the receiving is successful and the NAK packet in the first special acknowledge packet sent by the second device is not received in the n-th cycle.

Figure 17:
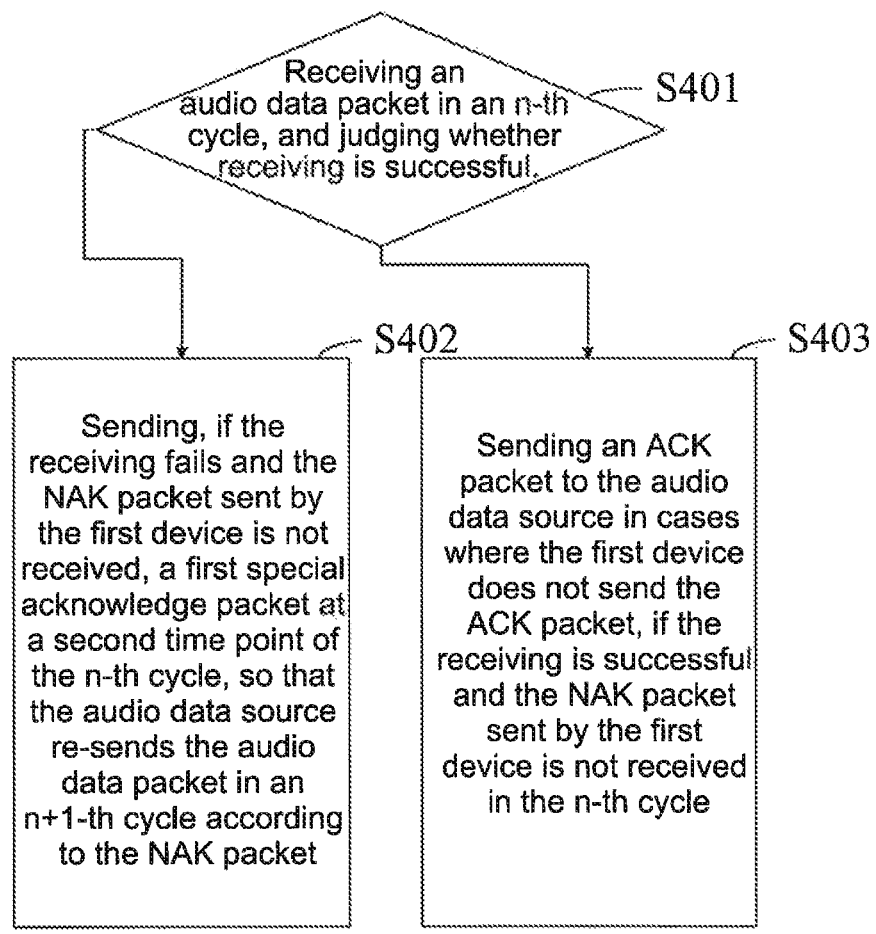
FIG. 17 is a fourth flowchart of the audio system data synchronization method provided in an embodiment of the present disclosure.

As shown in FIG. 17, an embodiment of the present disclosure further provides an audio system data synchronization method, wherein the audio system includes an audio data source, a first device, and a second device; and the method is applied to the second device, and includes:

S401, receiving an audio data packet sent by the audio data source in an n-th cycle, and judging whether receiving is successful;

S402, sending, if the receiving fails and the NAK packet sent by the first device is not received, a first special acknowledge packet at a second time point of the n-th cycle, making the audio data source re-send the audio data packet in an n+1-th cycle according to the NAK packet in the first special acknowledge packet, and making the first device receive, in synchronization with the second device in the n+1-th cycle, the audio data packet re-sent by the audio data source according to the first additional field in the first special acknowledge packet, wherein the second time point is later than the first time point; and S403, sending an ACK packet to the audio data source in cases where the first device does not send the ACK packet, if the receiving is successful and the NAK packet sent by the first device is not received in the n-th cycle.

In the above, the specific contents of the step S401 to the step S403 are already described in detail in the above embodiments, and thus are not repeatedly described herein again.

Figure 18:
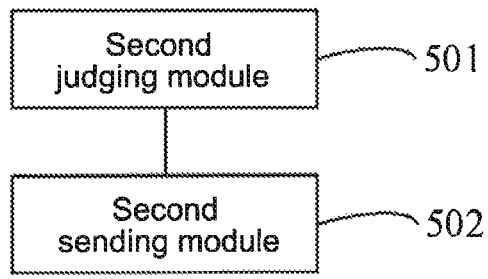
FIG. 18 is a second structural view of the audio system data synchronization device provided in an embodiment of the present disclosure.

As shown in FIG. 18, an embodiment of the present disclosure further provides an audio system data synchronization device, wherein the audio system includes an audio data source, a first device, and a second device; and the audio system data synchronization device is used in the second device, and includes: a second judging module 501 and a second sending module 502.

In the above, the second judging module 501 is configured to receive an audio data packet sent by the audio data source in an n-th cycle, and judge whether receiving is successful.

In the above, the second sending module 502 is configured to send, if the receiving fails and the NAK packet sent by the first device is not received, a first special acknowledge packet at a second time point of the n-th cycle; make the audio data source re-send the audio data packet in an n+1-th cycle according to the NAK packet in the first special acknowledge packet; and make the first device receive, in synchronization with the second device in the n+1-th cycle, the audio data packet re-sent by audio data source according to the first additional field in the first special acknowledge packet, wherein the second time point is later than the first time point. If the receiving is successful and the NAK packet sent by the first device is not received in the n-th cycle, the ACK packet is sent to the audio data source in cases where the first device does not send the ACK packet.

An embodiment of the present disclosure further provides an audio component, including a first device and a second device, wherein the audio component stores computer readable instructions, and when the computer readable instructions are executed by the audio component, the audio system data synchronization method according to any one of the above embodiments is run.

In the above, the first device and the second device are earphones; or the first device and the second device are loudspeaker boxes. Certainly, they are not limited thereto. In the above, in the above embodiment, the steps executed by the first device are stored in the first device in a form of computer program. The steps executed by the second device are present in the second device in a form of computer program.

Figure 19:
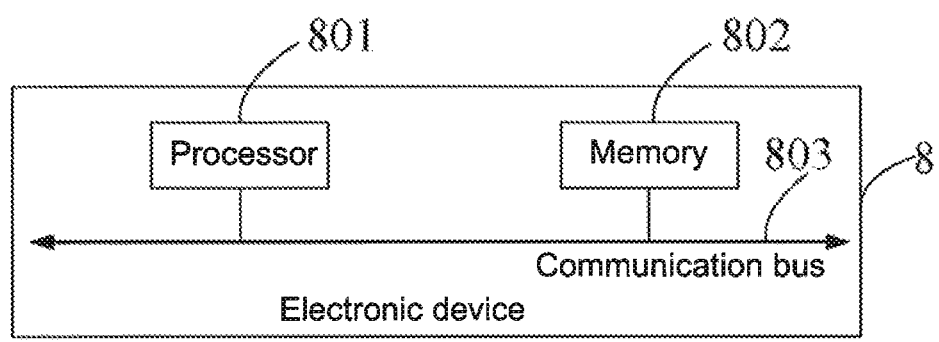
FIG. 19 is a structural schematic view of an electronic device provided in an embodiment of the present disclosure.

Referring to FIG. 19, FIG. 19 is a schematic structural view of an electronic device provided in an embodiment of the present disclosure. The present disclosure provides an electronic device 8, including a processor 801 and a memory 802, wherein the processor 801 and the memory 802 are interconnected and communicate with each other via a communication bus 803 and/or other forms of connection mechanisms (not shown), the memory 802 stores a computer program executable by the processor 801. When a computing device runs, the processor 801 executes the computer program, so as to execute the method in any optional implementation of the above embodiments.

An embodiment of the present disclosure provides a storage medium, and when the computer program is executed by a processor, the method in any optional implementation of the above embodiments is executed. In the above, the storage medium may be implemented by any type of volatile or non-volatile memory device or combination thereof, for example, Static Random Access Memory (SRAM for short), Electrically Erasable Programmable Read-Only Memory (EEPROM for short), Erasable Programmable Read-Only Memory (EPROM for short), Programmable Read-Only Memory (PROM for short), Read-Only Memory (ROM for short), magnetic memory, flash memory, magnetic disk or optical disk.

In the embodiments provided in the present disclosure, it should be understood that the device and the method disclosed may be implemented in other manners. The apparatus embodiment described in the above is merely exemplary, for example, the units are merely divided according to logical functions, but they may be divided in other manners in practical implementation, for another example, multiple units or components may be combined or may be integrated into another system, or some features may be omitted, or not executed. In addition, mutual couplings or direct coupling or communication connection as shown or discussed may be indirect coupling or communication connection via some communication interfaces, means or units, and may be in an electrical form, a mechanical form or other forms.

Besides, the units described as separate parts may be or also may not be physically separated, the parts displayed as units may be or also may not be physical units, i.e., they may be located at one place, or also may be distributed on a plurality of network units. The objective of the solution of the present embodiment may be realized by selecting part or all of the units thereof as actually required.

Besides, various functional modules in various embodiments of the present disclosure may be integrated together to form one independent portion, and it is also possible that various modules exist independently, or that two or more modules are integrated to form one independent part.

In the present text, relational terms such as first and second are merely for distinguishing one entity or operation from another entity or operation, while it is not necessarily required or implied that these entities or operations have any such practical relation or order.

The above-mentioned are merely for embodiments of the present disclosure and not intended to limit the scope of protection of the present disclosure. For one skilled in the art, various modifications and variations may be made to the present disclosure. Any modifications, equivalent substitutions, improvements and the like made within the spirit and principle of the present disclosure should be included within the scope of protection of the present disclosure.

INDUSTRIAL APPLICABILITY

The embodiments of the present disclosure provide the audio system data synchronization method and the audio component. As the audio system data synchronization method in the embodiment of the present disclosure can enable the first device and the second device to receive audio data packet simultaneously, the synchronism of audio data is improved, and only one device sends the first special acknowledge packet when the audio data packet fails to be received, so that signal interference caused by the fact that the two devices both send the first special acknowledge packet is avoided, and the power consumption is reduced; moreover, as the audio synchronization method in the embodiment of the present disclosure includes the steps that the first device sends the ACK packet to the audio data source when the timing signal satisfies the predetermined first condition and the second device sends the ACK packet to the audio data source when the timing signal satisfies the predetermined second condition, wherein the predetermined first condition and the predetermined second condition are mutually exclusive, the times that the first device and the second device send the ACK packet are balanced, further improving the balance of power consumption of the two devices.

What is claimed is:

1. A data synchronization method for an audio system, wherein the audio system comprises an audio data source, a first device and a second device; and the method comprises steps of:
    the first device receiving in an n-th cycle an audio data packet sent by the audio data source, and judging whether the receiving is successful; and
    the second device receiving in the n-th cycle the audio data packet sent by the audio data source, and judging whether the receiving is successful,
    wherein if the receiving of the first device and/or the second device is failed, one device of the first device and the second device whose receiving is failed sends a first special acknowledge packet in the n-th cycle, wherein the first special acknowledge packet comprises a first additional field and an NAK packet, the audio data source is made to re-send, after receiving the NAK packet, the audio data packet in an n+1-th cycle, and the other device is made to stop sending a signal in the n-th cycle after receiving the first additional field and receive, in synchronization with the one device whose receiving is failed, in the n+1-th cycle the audio data packet re-sent by the audio data source;
    wherein the method further comprises:
    if both the first device and the second device successfully receive, one device of the first device and the second device sending an ACK packet to the audio data source, and making the audio data source send a next audio data packet in the n+1-th cycle according to the ACK packet;
    wherein the first device and the second device are configured with a synchronized timing signal; and the step that one device of the first device and the second device sends an ACK packet to the audio data source comprises:
    the first device sending the ACK packet to the audio data source when the timing signal satisfies a predetermined first condition; and
    the second device sending the ACK packet to the audio data source when the timing signal satisfies a predetermined second condition, wherein the predetermined first condition and the predetermined second condition are mutually exclusive.

2. The data synchronization method for an audio system according to claim 1, wherein the first device and the second device are each configured with a count value for recording number of successful receiving of the two devices; and the step that one device of the first device and the second device sends an ACK packet to the audio data source comprises:
    if the count value is an odd number, the first device sending the ACK packet to the audio data source; and
    if the count value is an even number, the second device sending the ACK packet to the audio data source.

3. The data synchronization method for an audio system according to claim 1, wherein the step that one device of the first device and the second device whose receiving is failed sends a first special acknowledge packet in the n-th cycle if the receiving of the first device and/or the second device is failed comprises:
    if the receiving is failed in the n-th cycle, the first device sending the first special acknowledge packet at a first time point of the n-th cycle; making the audio data source re-send the audio data in the n+1-th cycle after receiving the NAK packet in the first special acknowledge packet; and making the second device stop sending a signal in the n-th cycle after receiving the first additional field in the first special acknowledge packet, and receive the re-sent audio data packet in synchronization with the first device in the n+1-th cycle.

4. The data synchronization method for an audio system according to claim 1, wherein the step that one device of the first device and the second device whose receiving is failed sends a first special acknowledge packet in the n-th cycle if the receiving of the first device and/or the second device is failed comprises:
    if receiving is failed and not receiving the first additional field in the first special acknowledge packet sent by the first device at the first time point of the n-th cycle, the second device sending the first special acknowledge packet at a second time point of the n-th cycle; making the audio data source re-send the audio data in the n+1-th cycle after receiving the NAK packet in the first special acknowledge packet; and making the first device stop sending a signal in the n-th cycle after receiving the first additional field in the first special acknowledge packet, and receive in the n+1-th cycle the re-sent audio data packet in synchronization with the second device, wherein the second time point is later than the first time point.

5. The data synchronization method for an audio system according to claim 1, wherein the method further comprises:
    the first device sending, when sending synchronization information to the second device in a k+1-th cycle, a second special acknowledge packet at a third time point of a k-th cycle, wherein the second special acknowledge packet comprises a second additional field; and making the second device stop sending a signal in the k-th cycle according to the second additional field in the second special acknowledge packet, and exchange the synchronization information according to a link rule of the first device and the second device in the k+1-th cycle, wherein the synchronization information is control information or data information.

6. The data synchronization method for an audio system according to claim 1, wherein the method further comprises:
    the second device sending, when the second device is to send synchronization information to the first device in a k+1-th cycle, the second special acknowledge packet at a fourth time point of the k-th cycle if the second device does not receive a second additional field in a second special acknowledge packet sent by the first device at a third time point of a k-th cycle; and making the first device exchange the synchronization information according to a link rule of the first device and the second device in the k+1-th cycle according to the second additional field in the second special acknowledge packet sent by the second device, wherein the synchronization information is control information or data information.

7. The data synchronization method for an audio system according to claim 6, wherein the link rule comprises a near-field communication link rule, and the near-field communication link rule comprises a Bluetooth link rule and/or a WIFI link rule.

8. The data synchronization method for an audio system according to claim 1, wherein the step of the first device receiving in an n-th cycle an audio data packet sent by the audio data source comprises: the first device receiving the audio data packet from an air interface in the n-th cycle, wherein the audio data packet is pre-sent by the audio data source to the air interface.

9. The data synchronization method for an audio system according to claim 1, wherein the step of the second device receiving in the n-th cycle the audio data packet sent by the audio data source comprises: the second device receiving the audio data packet from the air interface in the n-th cycle, wherein the audio data packet is pre-sent by the audio data source to the air interface.

10. The data synchronization method for an audio system according to claim 8, wherein the step that one device of the first device and the second device whose receiving is failed sends a first special acknowledge packet in the n-th cycle comprises: the one device of the first device and the second device whose receiving is failed sending the first special acknowledge packet to the air interface in the n-th cycle, so that the audio data source and the other device of the first device and the second device receive the first special acknowledge packet from the air interface.

11. The data synchronization method for an audio system according to claim 1, wherein the first device and the second device receive the audio data packet on a same receiving time slot.

12. The data synchronization method for an audio system according to claim 1, wherein after receiving, in synchronization with the device whose receiving is failed, in the n+1-th cycle the audio data packet re-sent by the audio data source, the method comprises: the other device judging whether the received audio data packet re-sent by the audio data source is same as the audio data packet previously received, wherein if same, the audio data packet re-sent by the audio data source is deleted.

13. The data synchronization method for an audio system according to claim 1, wherein the step that one device of the first device and the second device sends an ACK packet to the audio data source further comprises: only one device of the first device and the second device sending the ACK packet to the audio data source.

14. An audio component, comprising a first device and a second device, wherein the audio component stores computer readable instructions, and when the computer readable instructions are executed by the audio component, the method according to claim 1 is run.

15. A storage medium, stored thereon with a computer program, wherein the computer program, when being executed by a processor, runs the method according to claim 1.

16. The data synchronization method for an audio system according to claim 1, wherein the step that one device of the first device and the second device whose receiving is failed sends a first special acknowledge packet in the n-th cycle if the receiving of the first device and/or the second device is failed comprises:

if the receiving is failed in the n-th cycle, the first device sending the first special acknowledge packet at a first time point of the n-th cycle; making the audio data source re-send the audio data in the n+1-th cycle after receiving the NAK packet in the first special acknowledge packet; and making the second device stop sending a signal in the n-th cycle after receiving the first additional field in the first special acknowledge packet, and receive the re-sent audio data packet in synchronization with the first device in the n+1-th cycle.

17. The data synchronization method for an audio system according to claim 1, wherein the step that one device of the first device and the second device whose receiving is failed sends a first special acknowledge packet in the n-th cycle if the receiving of the first device and/or the second device is failed comprises:

if receiving is failed and not receiving the first additional field in the first special acknowledge packet sent by the first device at the first time point of the n-th cycle, the second device sending the first special acknowledge packet at a second time point of the n-th cycle; making the audio data source re-send the audio data in the n+1-th cycle after receiving the NAK packet in the first special acknowledge packet; and making the first device stop sending a signal in the n-th cycle after receiving the first additional field in the first special acknowledge packet, and receive in the n+1-th cycle the re-sent audio data packet in synchronization with the second device, wherein the second time point is later than the first time point.

18. The data synchronization method for an audio system according to claim 9, wherein the step that one device of the first device and the second device whose receiving is failed sends a first special acknowledge packet in the n-th cycle comprises: the one device of the first device and the second device whose receiving is failed sending the first special acknowledge packet to the air interface in the n-th cycle, so that the audio data source and the other device of the first device and the second device receive the first special acknowledge packet from the air interface.

* * * * *